United States Patent
Inaba et al.

(10) Patent No.: US 10,506,050 B2
(45) Date of Patent: Dec. 10, 2019

(54) DEVICE COOPERATION SUPPORT SYSTEM

(71) Applicants: KABUSHIKI KAISHA TOSHIBA, Minato-ku (JP); TOSHIBA DIGITAL SOLUTIONS CORPORATION, Kawasaki-shi (JP)

(72) Inventors: Masumi Inaba, Kawasaki (JP); Akira Ishitsuka, Fuchu (JP); Dai Kanazawa, Iruma (JP); Shinichi Fujita, Yokohama (JP); Takehiro Yoshimoto, Machida (JP); Kazuaki Takahashi, Tachikawa (JP)

(73) Assignees: KABUSHIKI KAISHA TOSHIBA, Minato-ku (JP); TOSHIBA DIGITAL SOLUTIONS CORPORATION, Kawasaki-shi (JP)

( * ) Notice: Subject to any disclaimer, the term of this patent is extended or adjusted under 35 U.S.C. 154(b) by 41 days.

(21) Appl. No.: 16/062,321

(22) PCT Filed: Sep. 20, 2017

(86) PCT No.: PCT/JP2017/033831
§ 371 (c)(1),
(2) Date: Jun. 14, 2018

(87) PCT Pub. No.: WO2018/061909
PCT Pub. Date: Apr. 5, 2018

(65) Prior Publication Data
US 2019/0007498 A1    Jan. 3, 2019

(30) Foreign Application Priority Data
Sep. 29, 2016 (JP) ................... 2016-190654

(51) Int. Cl.
*H04L 29/08* (2006.01)
*H04Q 9/00* (2006.01)

(52) U.S. Cl.
CPC ............. *H04L 67/125* (2013.01); *H04Q 9/00* (2013.01)

(58) Field of Classification Search
CPC ............................... H04L 67/125; H04Q 9/00
See application file for complete search history.

(56) References Cited

U.S. PATENT DOCUMENTS

| | | | | |
|---|---|---|---|---|
| 7,734,281 B2 * | 6/2010 | Ferguson | ............... | G06Q 10/00 455/412.1 |
| 9,173,090 B2 * | 10/2015 | Tuchman | ............... | G06Q 20/20 |
| 2010/0153237 A1 * | 6/2010 | LaJoie | ............... | G06Q 30/0256 705/26.1 |

FOREIGN PATENT DOCUMENTS

| | | |
|---|---|---|
| JP | 2003-143666 A | 5/2003 |
| JP | 2005-102156 A | 4/2005 |
| JP | 2005-130423 A | 5/2005 |

OTHER PUBLICATIONS

"*Project Linking*" https://linkingiot.com/, 17 pages (with partial Englsh translation).
(Continued)

*Primary Examiner* — El Hadji M Sall
(74) *Attorney, Agent, or Firm* — Oblon, McClelland, Maier & Neustadt, L.L.P.

(57) ABSTRACT

A device cooperation support system includes a user apparatus configured to receive an operation result output from an external device, to output a control signal for operating the external device, and to perform device cooperation control based on a device cooperation rule, and a device cooperation support apparatus configured to support device cooperation between the user apparatus and the external device. The device cooperation support apparatus receives registration of an external device from a device registrant, creates the device cooperation rule by combining condition clause information with execution clause information cre- (Continued)

ated on the basis of device operation definition information of the registered external device, and delivers the device cooperation rule to the selected user apparatus based on association between the selected user apparatus and the device cooperation rule.

8 Claims, 10 Drawing Sheets

(56) References Cited

OTHER PUBLICATIONS

IFTTT "*A world that works for you*", https://ifttt.com/, 3 pages.
"*My Things*", Yahoo!, https://mythings.yahoo.co.jp/, 8 pages (with partial English translation).
International Search Report dated Dec. 12, 2017 in PCT/JP2017/033831, filed on Sep. 20, 2017.

\* cited by examiner

[FIG.1]
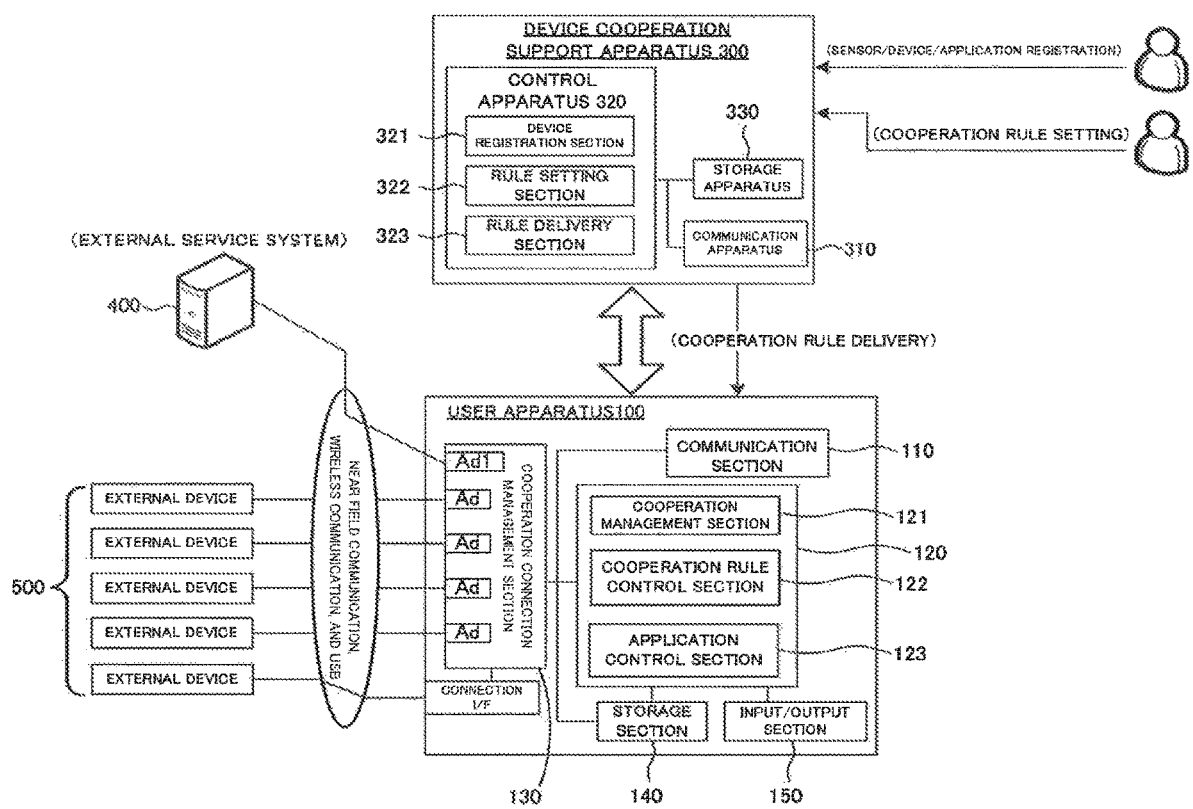

[FIG.2]
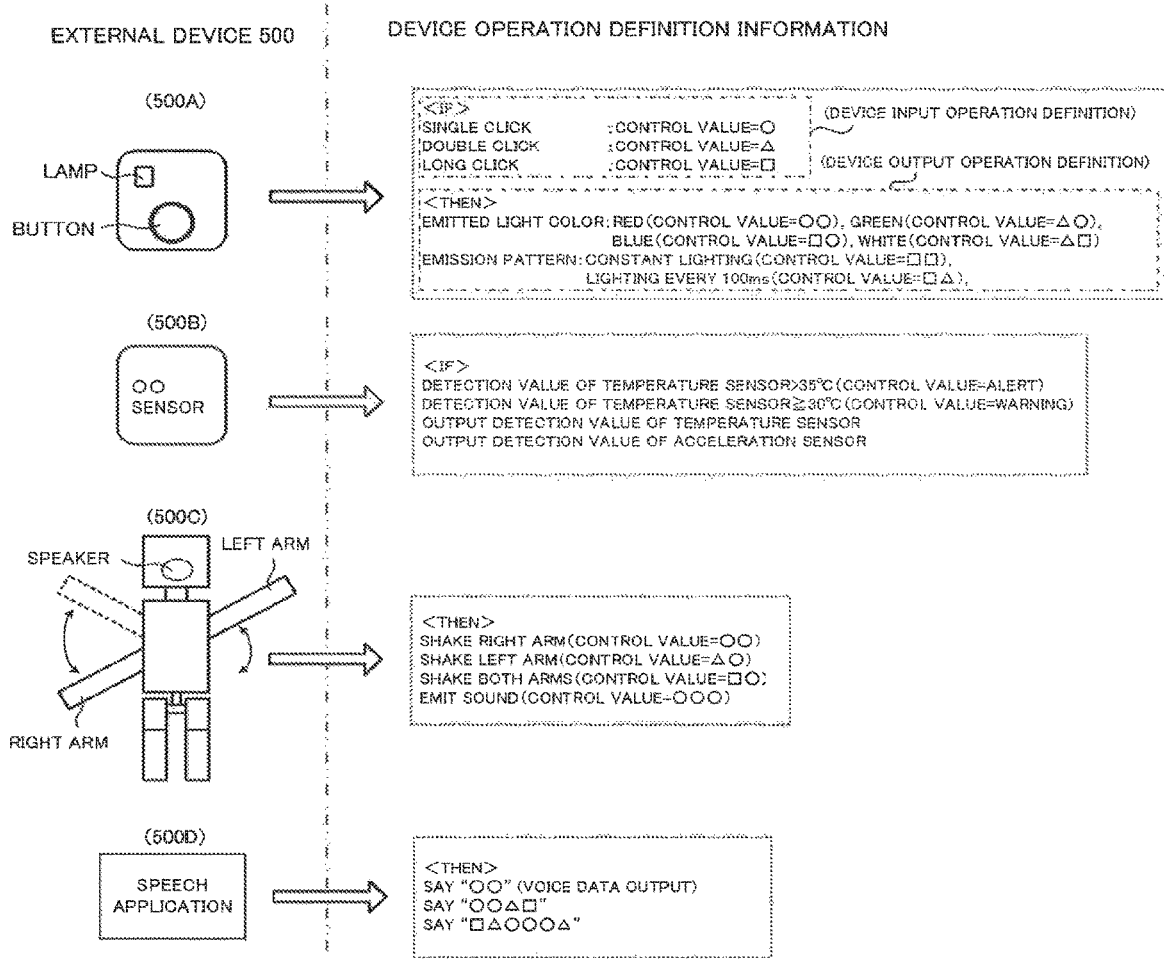
[FIG.3]
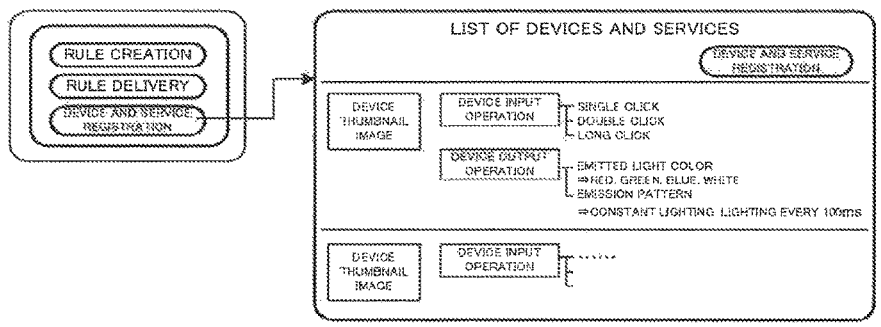

[FIG.4]
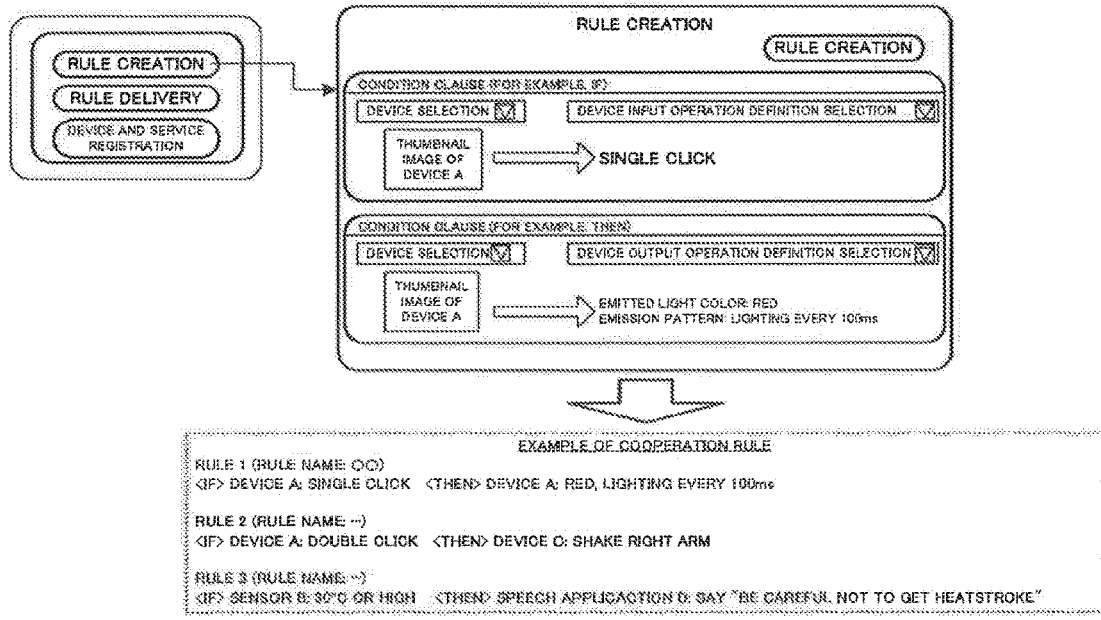
[FIG.5]
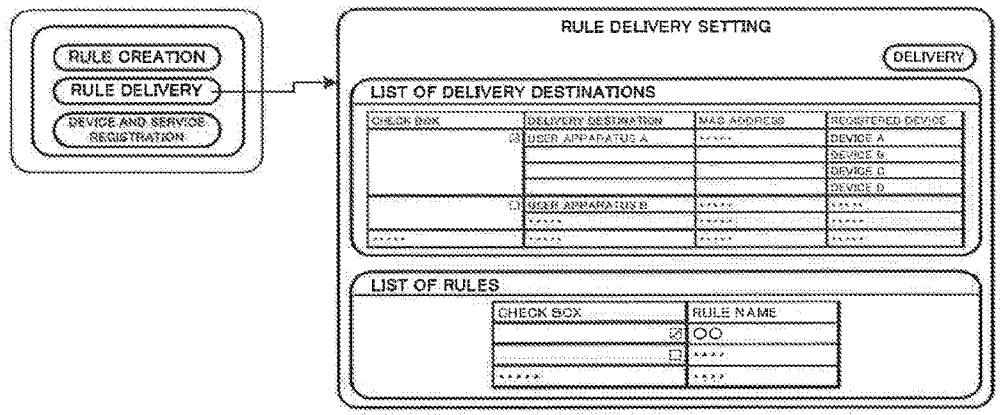
[FIG.6]
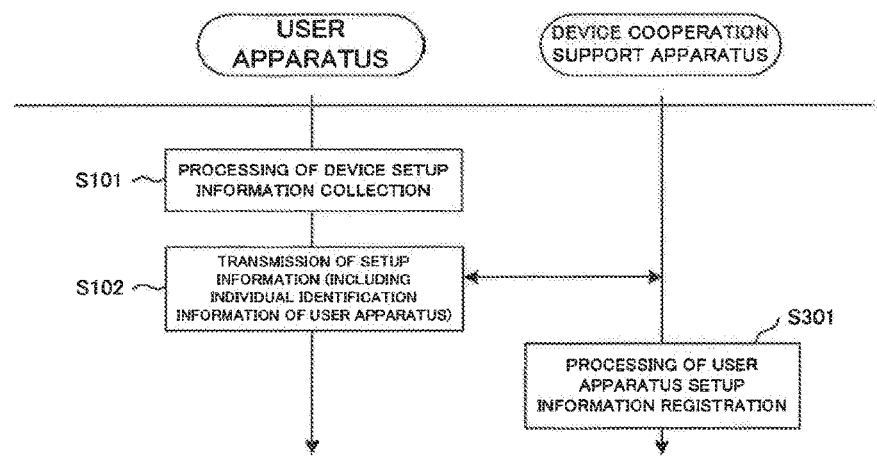

[FIG.7]
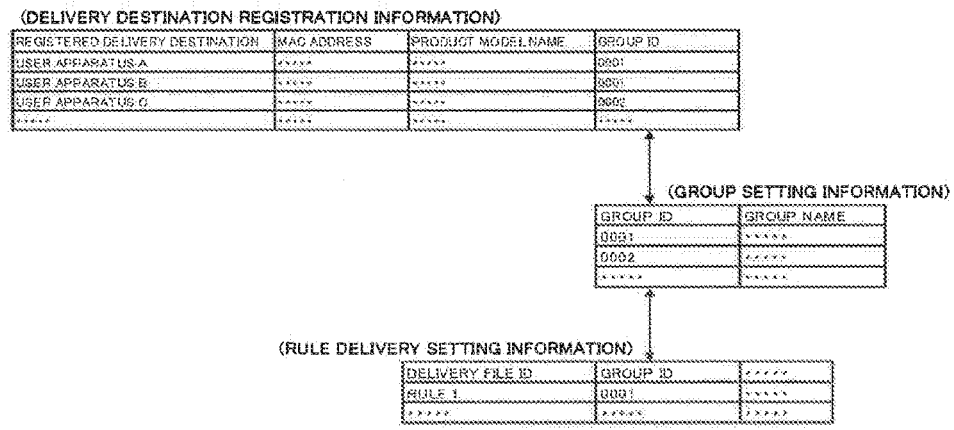
[FIG.8]
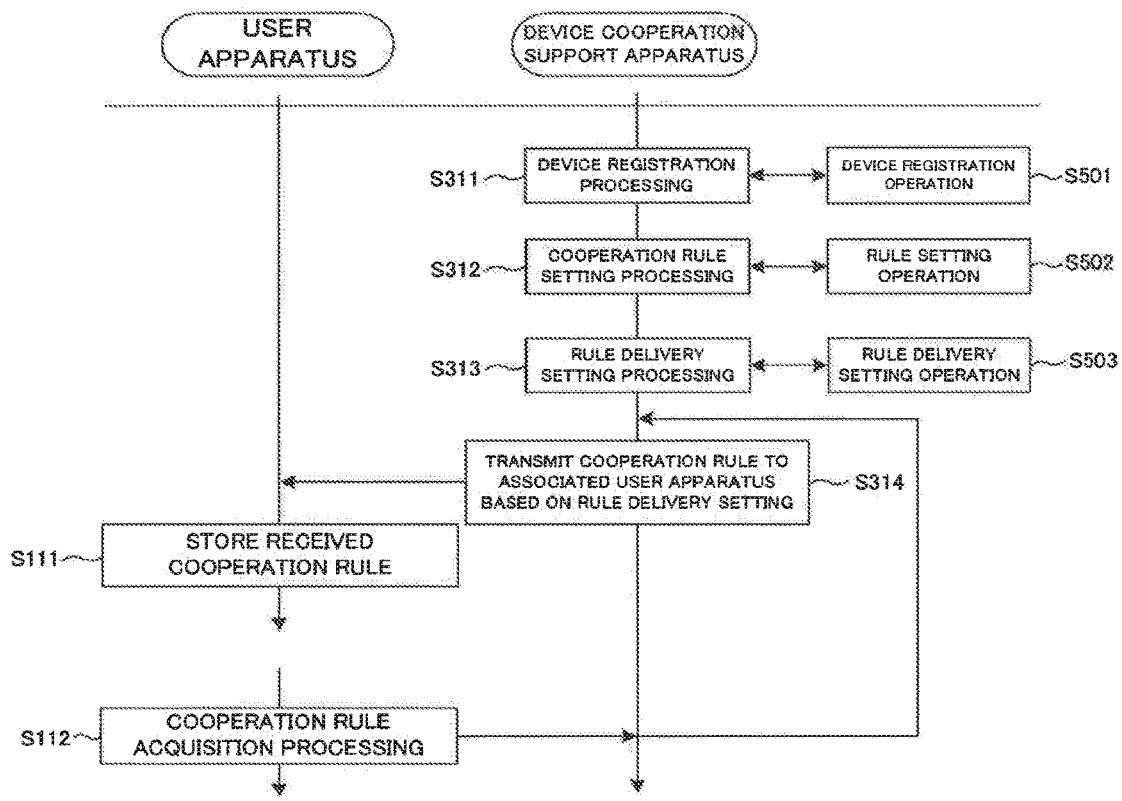

[FIG.9]
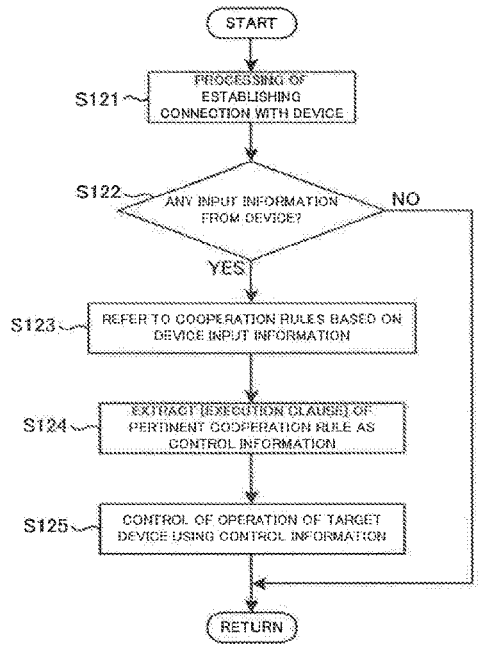
[FIG.10]
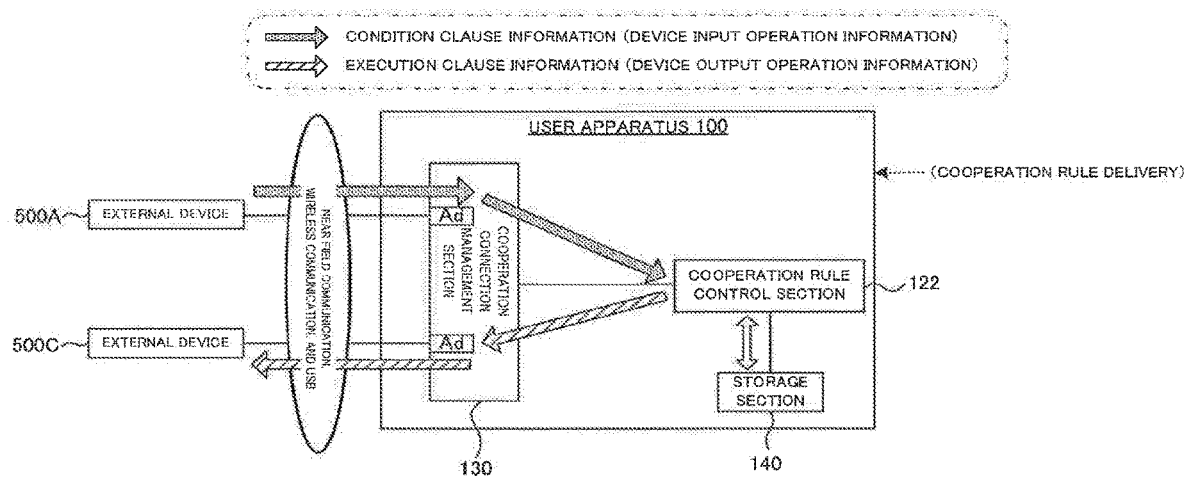

[FIG.11]
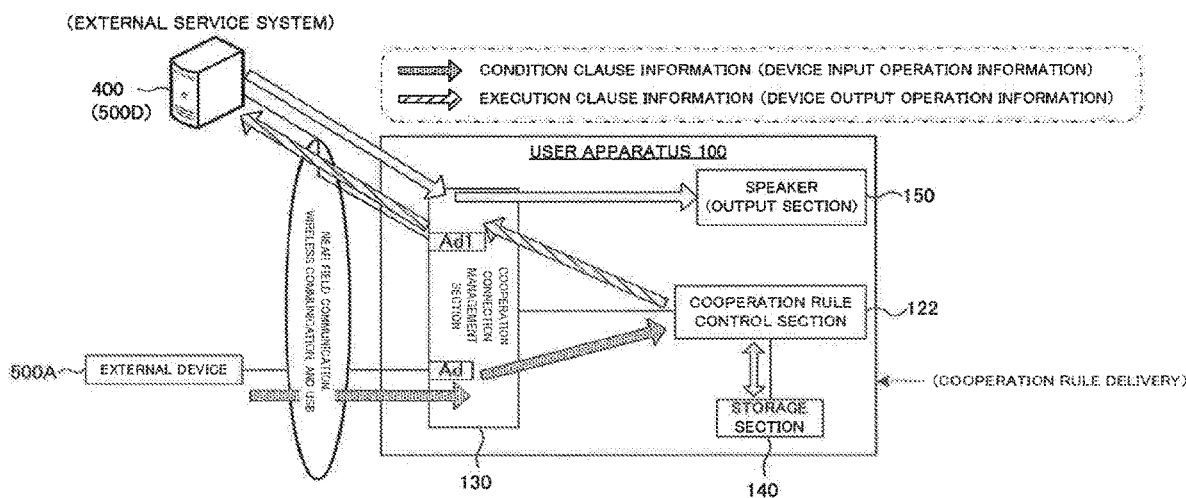
[FIG.12]
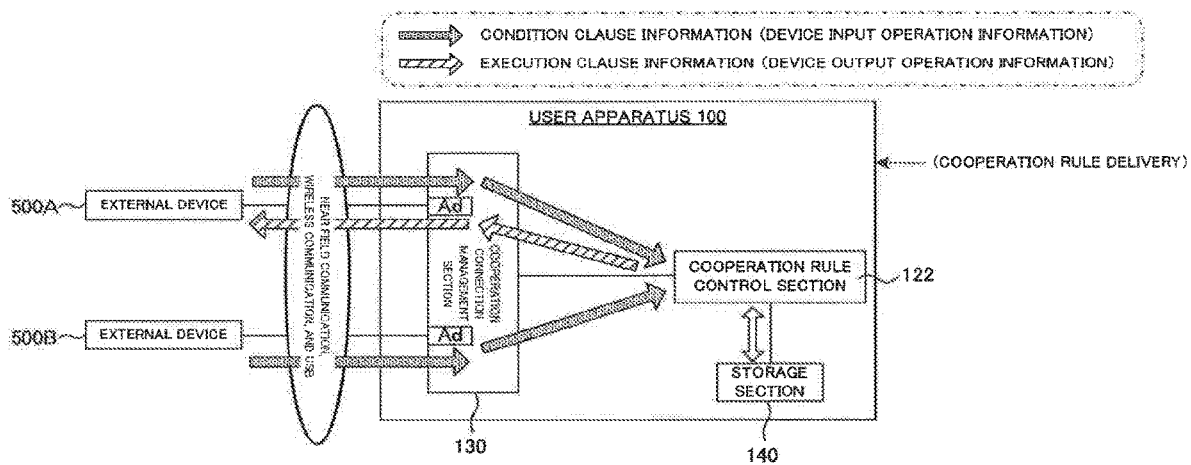

[FIG.13]
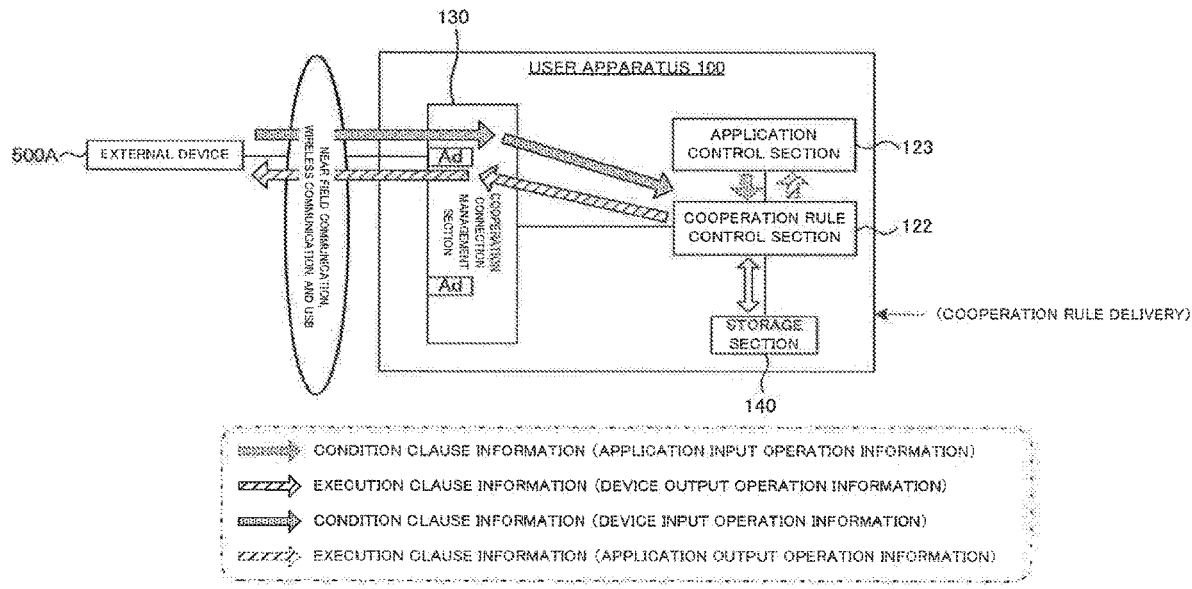
[FIG.14]
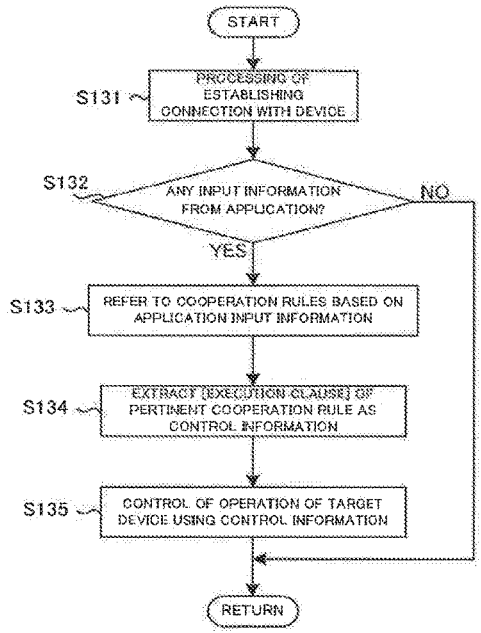

[FIG.15]
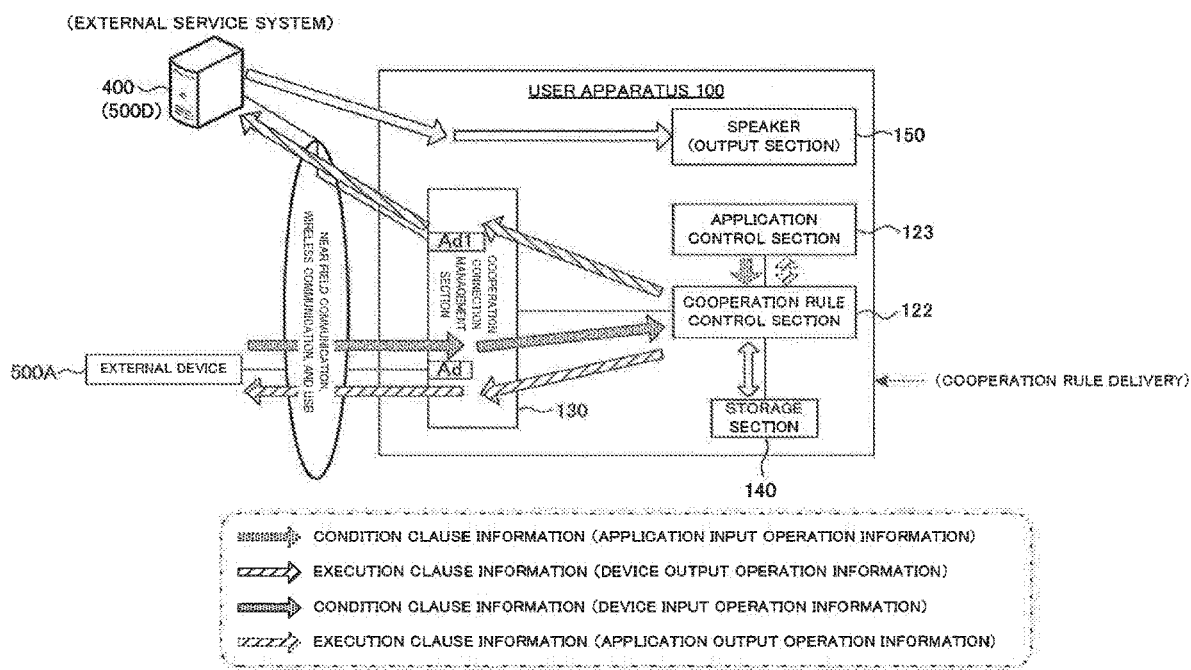

[FIG.16]
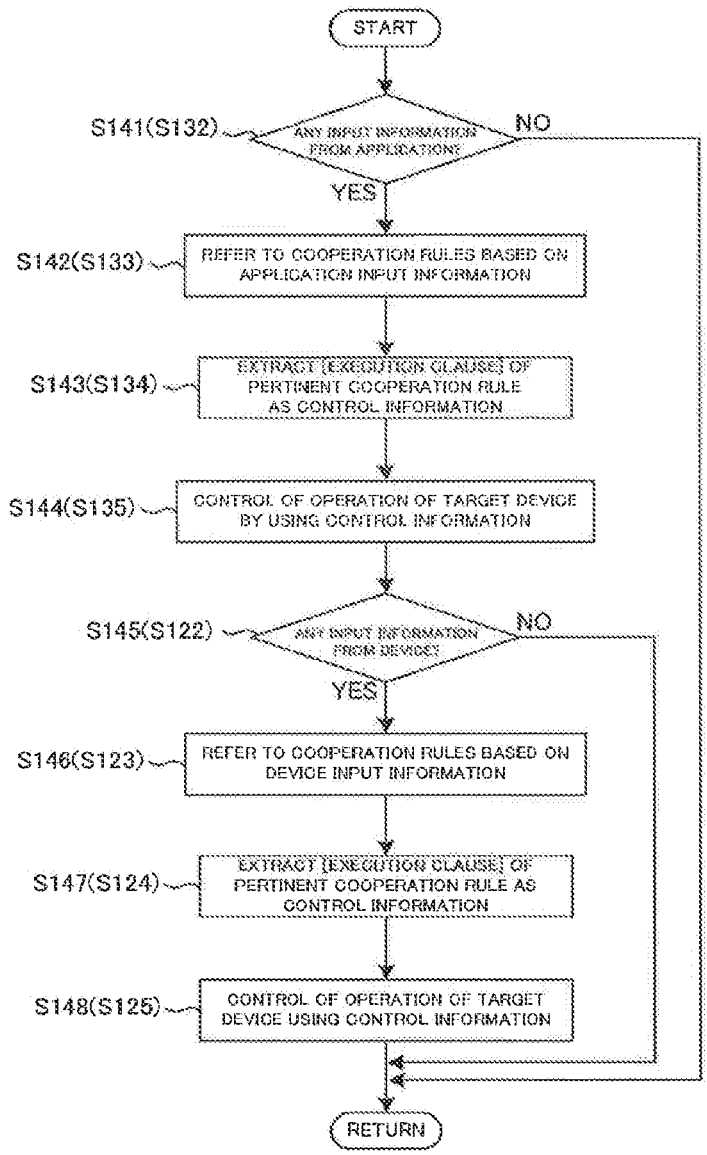

[FIG. 17]
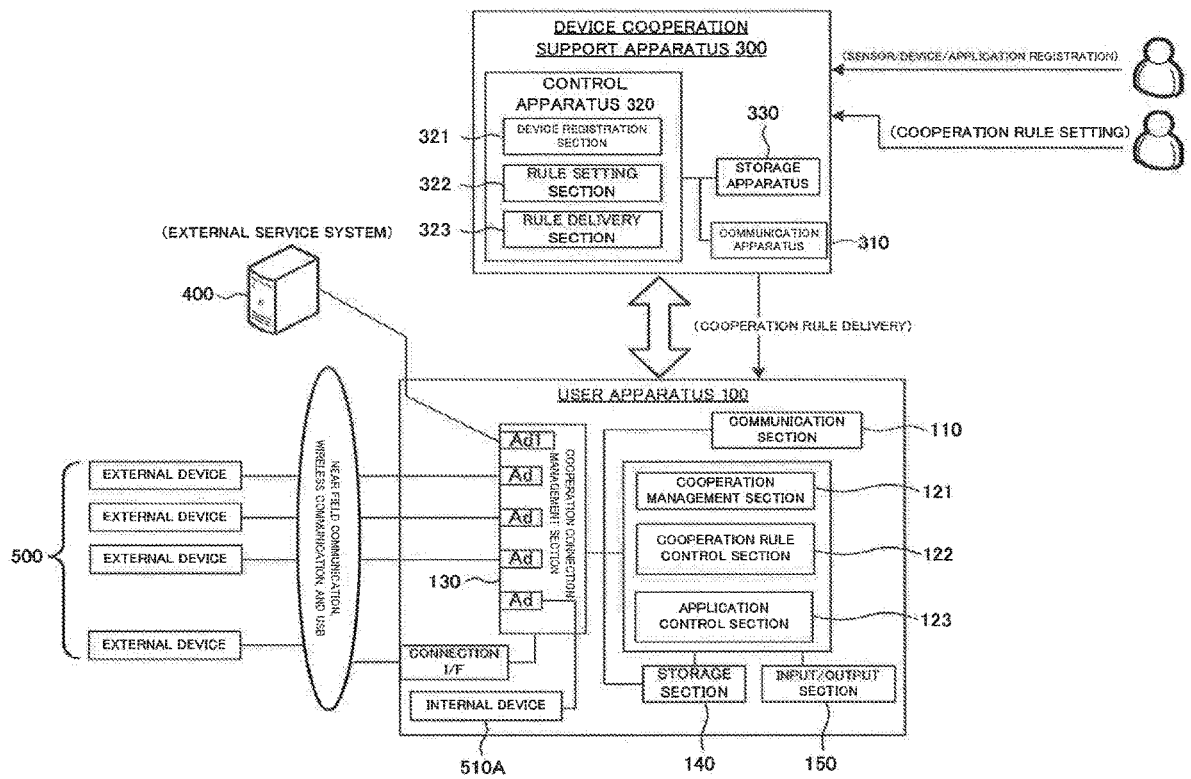
[FIG. 18]
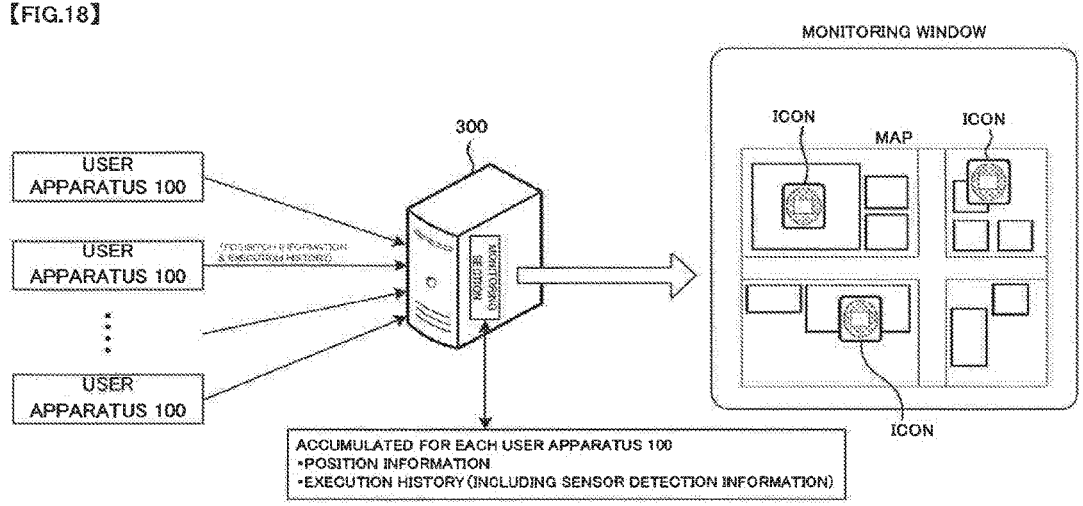

DEVICE COOPERATION SUPPORT SYSTEM

TECHNICAL FIELD

An embodiment of the present invention relates to a technique for supporting cooperation between a user apparatus and an external device.

BACKGROUND ART

Techniques relating to device cooperation have conventionally been proposed. An example of such techniques is a device cooperation technique based on a device cooperation rule (for example, a cooperation rule) composed of a condition clause and an execution clause in which if music is played, lighting equipment is turned on, or if light equipment is turned off, music playback is stopped.

PRIOR ART DOCUMENT

Patent Document

[Patent Document 1] Japanese Unexamined Patent Application Publication No. 2005-130423

DISCLOSURE OF THE INVENTION

Problems to be Solved by the Invention

It is an object of the present invention to provide a device cooperation support system which supports registration of an external device available for cooperation with a user apparatus, creation of a cooperation rule to be applied to such an external device, and management of operation control for the user apparatus based on the cooperation rule.

Means for Solving the Problems

An embodiment of the present invention provides a device cooperation support system including at least one user apparatus configured to receive an operation result output from an external device, to output a control signal for operating the external device to the external device, and to perform device cooperation control based on a device cooperation rule; and a device cooperation support apparatus configured to support device cooperation between the user apparatus and the external device.

The device cooperation support apparatus includes a device registration section configured to receive device operation definition information from a device registrant and to register the device operation definition information for each external device, the device operation definition information including at least one device input operation definition specifying operation result information provided from the external device to the user apparatus as an operation of the external device and/or at least one device output: operation definition specifying an operation of the external device provided from the user apparatus to the external device; a rule setting section configured to perform control to allow selection from the device operation definition information and to create the device cooperation rule by combining condition clause information including at least one of the device input operation definitions with execution clause information including at least one of the device output operation definitions, both definitions being selected by a cooperation rule creator; and a rule delivery section configured to perform control to allow selection of at least one of the user apparatuses as a delivery destination of the device cooperation rule and to deliver the device cooperation rule to the selected user apparatus based on association between the selected user apparatus and the device cooperation rule.

BRIEF DESCRIPTION OF THE DRAWINGS

FIG. 1 diagram showing the network configuration in a device cooperation support system and the functional blocks of apparatuses of the system according to Embodiment 1.

FIG. 2 A diagram showing an example of device operation setting information according to Embodiment 1.

FIG. 3 A diagram showing an example of device and service registration according to Embodiment 1.

FIG. 4 A diagram showing an example of cooperation rule creation according to Embodiment 1.

FIG. 5 A diagram showing an example of cooperation rule delivery setting according to Embodiment 1.

FIG. 6 A diagram showing an example of setup information registration processing in a user apparatus according to Embodiment 1.

FIG. 7 A diagram showing an example of delivery destination registration information, group setting information, and rule delivery setting information which relate to the cooperation rule according to Embodiment 1.

FIG. 8 A diagram showing processing of device registration, cooperation rule setting, rule delivery setting, and rule delivery to the user apparatus, performed by a device cooperation support apparatus according to Embodiment 1.

FIG. 9 A flow chart showing device cooperation processing based on the cooperation rule in the user apparatus according to Embodiment 1.

FIG. 10 A diagram showing an example of device cooperation based on the cooperation rule in the user apparatus according to Embodiment 1.

FIG. 11 A diagram showing an example of cooperation between the device and an external service system based on the cooperation rule in the user apparatus according to Embodiment 1.

FIG. 12 A diagram showing an example of device cooperation based on the cooperation rule in the user apparatus according to Embodiment 1.

FIG. 13 A diagram showing an example of cooperation between the device and an application based on the cooperation rule in the user apparatus according to Embodiment 1.

FIG. 14 A flow chart showing processing of cooperation between the device and the application based on the cooperation rule in the user apparatus according to Embodiment 1.

FIG. 15 A diagram showing an example of cooperation between the device, the application, and the external service system based on the cooperation rule in the user apparatus according to Embodiment 1.

FIG. 16 A diagram showing a processing flow of the cooperation example shown in FIG. 15.

FIG. 17 A diagram showing a variation of the device cooperation support system according to Embodiment 1.

FIG. 18 A diagram for explaining an example of monitoring control performed by using the device cooperation support system according to Embodiment 1.

MODE FOR CARRYING OUT THE INVENTION

An embodiment of the present invention will be described in the following with reference to the accompanying drawings.

Embodiment 1

FIG. 1 is a diagram showing the network configuration in a device cooperation support system according to Embodiment 1 and the functional blocks of apparatuses constituting the device cooperation support system.

The device cooperation support system according to the present embodiment supports the cooperation of device operation between a user apparatus 100 owned by a user and each of external devices 500. For example, the device cooperation support system manages the registration of the external device 500 available for cooperation with the user apparatus 100, the setting of a device cooperation rule using the external device 500, and the delivery of the device cooperation rule. The device cooperation rule is, for example, a cooperation rule composed of a condition clause and an execution clause such as IF-THEN clauses, and is referred to as a "cooperation rule" for description. Examples other than the IF-THEN clauses include a CASE type and a DICISION_TABLE type. However, the device cooperation rule is not limited thereto, and may be any rule that is composed of a condition clause and an execution clause.

For example, the user apparatus 100 includes a portable (mobile) information terminal, a laptop, and a tablet computer that each has a data communication function and a computing function (provided by a CPU or the like). For example, the portable (mobile) information terminal includes a multi-functional cellular phone and a Personal Digital Assistant (PDA).

The external device 500 is, for example, sensor equipment such as a temperature sensor, a humidity sensor, and an acceleration sensor, lighting equipment having a light-emitting element such as an LED lamp, or input equipment having an input section such as an operation button. For example, the external device 500 also includes a single piece of equipment formed of sensor equipment and an LED lamp in combination or a single piece of equipment formed of input equipment and an LED lamp in combination.

The external device 500 as described above is equipment separated physically from the user apparatus 100 and is capable of communication (connection) with the user apparatus 100 via near field communication such as Bluetooth® or via wireless communication such as Wi-Fi. In addition, the external device 500 can be connected directly to the user apparatus 100 through a USB connector provided for the external device 500 or can be connected by wire to the user apparatus 100 through a USB cable.

When the external device 500 is sensor equipment, it outputs sensor detection information about detection by the sensor to the user apparatus 100. When the external device 500 is input equipment, it outputs operation information about operation performed on the input section (for example, a signal indicating that the operation button is pressed) to the user apparatus 100. When the external device 500 is lighting equipment, a control signal can be input thereto from the user apparatus 100, and based on the control signal, the lighting equipment can emit light in a predetermined color or can be blinked.

When the external device 500 is a single piece of equipment formed of sensor equipment and an LED lamp in combination, the external device 500 can perform operation of turning on the LED lamp based on information detected by the sensor. Similarly, when the external device 500 is a single piece of equipment formed of input equipment and an LED lamp in combination, the external device 500 can perform operation of turning on the LED lamp based on the result of operation performed on the input section.

The external device 500 can also include drive equipment such as a robot and a radio control car. The drive equipment, for example a robot, can receive a control signal output from the user apparatus 100 and shake arms, walk, or run in response thereto. The drive equipment such as a robot may include the sensor equipment, lighting equipment, or input equipment as described above.

The user apparatus 100 is configured to include a communication section 110, a control section 120, a cooperation connection management section 130, a storage section 140, and an input/output section 150.

The cooperation connection management section 130 manages the connection between each of the external devices 500 and the user apparatus 100. The cooperation connection management section 130 includes adaptors (Ad) to the respective external devices 500 and has a relay function of connecting the external devices 500 with the control section 120 to pass and convert, data and control signals between them. The external devices 500 and the associated adaptors each have a one-to-one relationship, and the adaptors can be preinstalled in the user apparatus 100 or can be downloaded and installed from a device cooperation support apparatus 300 or a predetermined server as required.

The cooperation connection management section 130 also includes an adaptor (Adl) for connection to an external service system 400. The external service system 400 is, for example, a cloud service system which performs voice recognition and voice synthesis. The cooperation connection management section 130 is connected to a connection I/F. The connection I/F is, for example, a wired connection port such as a USB port.

The communication section 110 controls wireless/wired communication with the device cooperation support apparatus 300 via an IP network such as the Internet. The communication section 110 also serves as a communication interface with the external device 500. Thus, the communication section 110 is configured to include a communication device for near field communication or wireless communication, and controls external communication with the device cooperation support apparatus 300, the external service system 400, and the external device 500.

The input/output section 150 includes a display section such as a display apparatus, an input section such as an input operation button, a touch panel and a microphone, and an output section such as a speaker.

The control section 120 is configured to include a cooperation management section 121, a cooperation rule control section 122, and an application control section 123. The control section 120 (CPU) is responsible for the overall control of the user apparatus 100.

In the device cooperation support system according to the present embodiment, the device cooperation support apparatus 300 manages devices available for cooperation with the user apparatus 100, the device cooperation support apparatus 300 sets (creates) a cooperation rule for the external device 500 and delivers the rule to a single or a plurality of user apparatuses 100.

The cooperation management section 121 uploads device setup information of the user apparatus 100 to the device cooperation support apparatus 300 and receives (or downloads) a cooperation rule from the device cooperation support apparatus 300. The cooperation rule control section 122 performs control of the external device 500, control of an application through the application control section 123, and control of the input/output section 150 in accordance with cooperation rules stored in the storage section 140. The application control section 123 controls various types of software preinstalled in the user apparatus 100 (for example, a mail function) or functions provided when the user apparatus 100 is connected to the external service system 400.

Next, the device cooperation support apparatus 300 is described. As shown in FIG. 1, the device cooperation support apparatus 300 is configured to include a communication apparatus 310, a control apparatus 320, and a storage apparatus 330.

A device registration section 321 performs processing for registering the external device 500. The registration of the external device 500 can be performed, for example, by a provider of the external device 500 (device registrant) using a computer apparatus to connect to the device cooperation support apparatus 300 via the Internet or the like.

FIG. 2 is a diagram showing an example of device op e ration definition information of the external device 500. The device operation definition information is a definition file which is set for each of the external devices 500 to be registered.

In the example of FIG. 2, an external device 500A is a device provided with an input (press) button and a lamp. The external device 500A detects "single click," "double click," or "long click (long press)" as operation input to the input button, and outputs a control value in response to the detected operation input. The lamp can emit light in a predetermined color of a plurality of preset colors and in a plurality of prepared emission patterns (such as "constant lighting" or "lighting every 100 ms").

The device registrant registers two separate definitions of how the registered external device 500 operates, that is, a device input operation definition in which the device supplies operation result information to the user apparatus 100 and a device output operation definition in which the user apparatus 100 supplies a signal for operating the device.

The device input operation definition is, for example, information including a type of operation input to the external device 500 and a control values for identifying each operation input. When the external device 500 is sensor equipment, "sensor detection information" is included in the device input operation definition as shown in FIG. 2. In addition to the sensor detection information, the device input operation definition of the sensor equipment can include, for example, adjunct information (for example, alert). In this case, when the circuitry is configured such that alert is output from the sensor equipment if a sensor detection value exceeds a predetermined threshold value, the sensor detection information and/or alert information can be set as the device input operation definition. In the example of FIG. 2, the device input operation definition is specified as a condition clause <IF>.

The device output operation definition is control information for allowing the user apparatus 100 to cause the external device 500 to perform predetermined operation. Specifically, operation which can be performed by the external device 500 and control information for performing that operation are specified in an execution clause <THEN>.

In the example of FIG. 2, the external device 500A has a specified set of device input operation definition and device output operation definition, whereas an external device 500B, which is sensor equipment, has only a device input operation definition specified therein. The external device 500B only supplies the sensor detection information or the like to the user apparatus 100, and does not receive any input of information from the user apparatus 100 for performing predetermined operation, so that only <IF> is specified but <THEN> is not specified.

An external device 500C is a robot capable of shaking arms and has a speaker. In this case, the external device 500C has only a device output operation definition specified therein, and does not have any <IF> specified therein that corresponds to a device input operation definition. Specifically, the external device 500C is only supplied with a signal for operating the external device 500C from the user apparatus 100 and only operates under control of the user apparatus 100. The external device 500C is not a device which supplies operation result information to the user apparatus 100.

While the present embodiment supports the cooperation between the physical device and the user apparatus 100 as described above, for example, the external service system 400 can be regarded as the external device 500. Specifically, the external service system 400 is supplied with a signal from the user apparatus 100 for operating a service function provided by the external service system 400 and operates under control (upon request) of the user apparatus 100. Thus, similarly to the external device 500A performing "lighting" operation based on a control signal relating to "lighting" that is output from the user apparatus 100, the external service system 400 providing a predetermined service function can be regarded as cooperation with an external device.

For this reason, in the present embodiment, the external service system 400 configured to perform voice recognition processing/voice synthesis output processing, by way of example, can be registered as an external device 500D providing a speech application, and device operation definition information of the external device 500D is set. As seen in the example of FIG. 2, a device output operation definition including saying "oo" and the like is specified in <THEN> for the speech application.

FIG. 3 is a diagram showing an example of device and service registration. As shown in FIG. 3, the device registrant can select a "device and service registration" button in a menu window to register the external device 500 available for cooperation with the user apparatus 100. In the example of FIG. 3, the device registrant can register a thumbnail image or a name of a device and also register a device input operation definition and/or a device output operation definition of the device.

The rule setting section 322 creates a cooperation rule based on the registered device operation definition information. Unlike the device operation definition information, the cooperation rule is a defined rule of cooperation between a single or a plurality of external devices 500 and the user apparatus 100.

While the cooperation rule in the present embodiment is created through selection of a single or a plurality of external devices 500 from the registered external devices 500 by a cooperation rule creator different from the device registrant, the device registrant may create the cooperation rule.

FIG. 4 is a diagram showing an example of cooperation rule creation. As shown in FIG. 4, the cooperation rule creator can select a "rule creation" button in the menu window to create and register a cooperation rule for the external device 500 available for cooperation with the user apparatus 100. Specifically, the rule setting section 322 performs control to allow the cooperation rule creator to select any of the registered external devices 500 and the device operation definition information and the like.

The cooperation rule is a rule which specifies a condition and its execution in the external device 500, and includes at least one <IF> and at least one <THEN>. As shown in the example of FIG. 4, in an "if" item, at least one external device 500 is selected and a device input operation definition of the selected external device 500 is selected. Similarly, in a "THEN" item, at least one external device 500 is selected and a device output operation definition of the selected external device 500 is selected.

For example, "If external device 500A is single-clicked (IF), external device 500A emits red light at intervals of 100 ms (THEN)" can be created as a rule 1. The rule 1 is a cooperation rule to be applied to the same external device 500A.

As a rule 2, "If external device 500A is double-clicked (IF), external device 500C shakes right arm (THEN)" can be created. The rule 2 is a cooperation rule to be applied to different external devices 500A and 500C.

As a rule 3, "If external device 500B detects a temperature of 30° C. or higher (IF), external device 500D says "Be careful not to get heatstroke" (THEN)" can be created. The rule 3 is a cooperation rule which is to be applied to different external devices 500B and 500D and uses the external service system 400. In the rule 3, a temperature threshold value can be input when its device input operation definition corresponding to "IF" is set.

The cooperation rule is not limited to the above examples, and for example, can be created such that the device input operation definitions of two or more external devices 500 are set in <IF>, and if these two or more conditions are satisfied, operation <THEN> of the same or different external devices 500 is performed. In this manner, the cooperation rule can be created by combining a plurality sets of IF-THEN items, combining a plurality of IF items with a single THEN item, or combining a single IF item with a plurality of THEM items.

The rule setting section 322 controls the cooperation rule creation processing with a computer apparatus of the cooperation rule creator and stores the created cooperation rule in the storage apparatus 330.

The cooperation rule can be created to include, corresponding to the device input operation definition, a control value (for example, information identifying a single click) or a threshold value (for example, a temperature threshold value) which is output from the external device 500 and input to the user apparatus 100. Similarly, the cooperation rule can be created to include, corresponding to the device output operation definition, a control value (for example, control information for performing "lighting" operation) or a request (for example, a request for processing to the external service system 400) which is output from the user apparatus 100 and output to the external device 500.

As described later, in delivering the cooperation rule to the user apparatus 100, the device operation definition information of the external device 500 included in the cooperation rule can be delivered collectively, and the control in the user apparatus 100 based on the cooperation rule can be performed with reference to the collected device operation definition information.

The system according to the present embodiment receives, from the device registrant, the device operation definition information including the device input operation definition specifying the operation result information provided from the external device 500 to the user apparatus 100 as the operation of the external device 500 and/or the device output operation definition specifying the operation of the external device 500 provided from the user apparatus 100 to the external device 500, and registers the device operation definition information for each external device. As shown in FIG. 4, the system performs control to allow selection from the device operation definition information and to create the cooperation rule (device cooperation rule) by combining the condition clause information (for example, <IF>) including at least one device input operation definition with the execution clause information (for example, <THEN>) including at least one device output operation definition, both definitions being selected by the cooperation rule creator.

FIG. 5 is a diagram showing an example of cooperation rule delivery setting. As shown in FIG. 5, for example, the cooperation rule creator can select a "rule delivery" button in the menu window to associate the created cooperation rule with each user apparatus 100. The rule delivery section 323 performs control to allow the cooperation rule creator to select any of the registered user apparatuses 100 and to select the cooperation rule from a list of created cooperation rules for delivery to a destination.

As shown in the example of FIG. 5, the device cooperation support apparatus 300 can previously know and manage the user apparatuses 100 corresponding to destinations of cooperation rule delivery. FIG. 6 is a diagram showing an example of setup information registration processing in the user apparatus 100. The user apparatus 100 (cooperation management section 121) collects information about any connectable external device 500 via the cooperation connection management section 130 at a predetermined time. For example, the cooperation management section 121 communicates with each external device 500 via the cooperation connection management section 130 to collect the information about any communicable external device 500 as device setup information (S101).

Then, the cooperation management section 121 can transmit individual identification information of the user apparatus 100 (for example, MAC address), product information of the user apparatus 100 (such as model, OS, and installed application), and setup information including the collected device setup information to the device cooperation support apparatus 300 at a predetermined time (S102). The device cooperation support apparatus 300 (rule delivery section 323) stores the received setup information in the storage apparatus 330 for each user apparatus 100 (S301).

The individual identification information and the product information of the user apparatus 100 may be configured to be transmitted once to the device cooperation support apparatus 300. The cooperation management section 121 may be configured to transmit the newest device setup information to the device cooperation support apparatus 300 in response to communication being enabled in a new external device 500 or to communication being disabled in an external device 500 which has been capable of communication.

FIG. 7 is a diagram showing an example of delivery destination registration information, group setting information, and rule delivery setting information which relate to cooperation rule delivery setting. As described above, the setup information of each of a plurality of user apparatuses 100 is registered in the device cooperation support apparatus 300. The plurality of user apparatuses 100 can be previously divided into groups, and the cooperation rule can be set for each of the groups and delivered.

The grouping is performed, for example, according to model (manufacturer) of the user apparatus 100. Since the specifications of the user apparatuses 100 vary from one model to another, the user apparatuses of the same model can be grouped into one, and the same cooperation rule can be delivered to each group. As another example, the user apparatuses 100 can be grouped according to available external device 500 included in the device setup information, or the user apparatuses 100 can be grouped according to user type (for example, user attribute such as family, company, or department).

The delivery destinations of the cooperation rules, that is, the user apparatuses 100, can be previously grouped as described above to apply a cooperation rule between a plurality of user apparatuses 100 in synchronization or to apply a different cooperation rule to each of the models of the user apparatuses 100.

FIG. 8 is a diagram showing processing of device registration, cooperation rule setting, rule delivery setting, and rule delivery to the user apparatus 100, performed by the device cooperation support apparatus 300.

The device registrant connects to the device cooperation support apparatus 300 from the computer apparatus. Upon selection of the "device and service registration" button in the menu window, the device registration section 321 controls the processing of registering an external device 500 available for cooperation with the user apparatus 100 through the device and service registration window (S311). The device registrant registers the thumbnail image or the name of the device, the device input operation definition and/or device output operation definition (S501). The device registration section 321 stores the registered information in the storage apparatus 330 for each device. As described above, the device registrant may register the adaptor for the external device 500 together in the device cooperation support apparatus 300.

Next, the cooperation rule creator connects to the device cooperation support apparatus 300 irons the computer apparatus. Upon selection of the "rule creation" button in the menu window, the rule setting section 322 controls the processing of creation of a cooperation rule for the external device 500 available for cooperation with the user apparatus 100 through the device and service registration window (S312).

The cooperation rule creator can select an external device 500 from a single or a plurality of registered external devices 500 and device operation definition information for use in a "condition clause <IF>" and also select an external device 500 and device operation definition information for use in an "execution clause <THEN>" to create a cooperation rule (S502). The rule setting section 322 stores each created cooperation rule in the storage apparatus 330.

Then, the cooperation rule creator performs the cooperation rule delivery setting subsequent to the cooperation rule creation or by newly connecting to the device cooperation support apparatus 300 from the computer apparatus. Upon selection of the "rule delivery" button in the menu window, the rule delivery section 323 controls the rule delivery setting processing of setting a cooperation rule delivery destination (user apparatus 100) through the rule delivery setting window (S313).

The cooperation rule creator performs setting operation of associating each user apparatus 100 with the created cooperation rule (S503). The rule delivery section 323 creates rule delivery setting information (information associating the user apparatus 100 with the cooperation rule) based on the setting operation made by the cooperation rule creator and stores the created information in the storage apparatus 330.

As described above, the rule delivery section 323 can provide, as the rule delivery setting processing, the grouping function, the function of grouping the user apparatuses 100, and the function of associating each group with the cooperation rule, for the cooperation rule creator.

The rule delivery section 323 delivers the cooperation rule to each user apparatus 100 based on the rule delivery setting (S314). The time of the delivery can be arbitrarily set. For example, the cooperation rule can be immediately delivered by selecting a "delivery" button in the rule delivery setting window shown in FIG. 5. Alternatively, the rule delivery section 323 can perform control such that the delivery time can be set in the rule delivery setting window and the cooperation rule can be delivered at the set delivery time.

The user apparatus 100 receives the cooperation rule from the device cooperation support apparatus 300 and stores the received cooperation rule in the storage section 140 (S111). The processing can also be controlled such that the user apparatus 100 transmits a cooperation rule acquisition request to the device cooperation support apparatus 300 (S112), and in response to the acquisition request, the device cooperation support apparatus 300 can deliver the requested cooperation rule to the user apparatus 100 based on the rule delivery setting.

FIG. 9 is a flow chart showing device cooperation processing based on the cooperation rule in the user apparatus 100.

The cooperation management section 121 outputs a request to the cooperation connection management section 130 for connection with external devices 500. The cooperation connection management section 130 performs processing of connecting to each external device 500 through the associated adaptor (S121). Upon reception of input information (operation result information) from an external device 500 to the user apparatus 100 (YES at S122), the cooperation rule control section 122 refers to cooperation rules stored in the storage section 140 (S123). The cooperation rule control section 122 identifies (searches for) the pertinent cooperation rule for the external device 500 and extracts "THEN" which is the execution clause of the identified cooperation rule as control information (S124). The cooperation rule control section 122 performs operation control based on "THEN" targeted for an external device 500 included in the extracted control information (S125).

FIG. 10 is diagram showing an example of device cooperation based on the cooperation rule in the user apparatus 100. The example of FIG. 10 shows the control of the external device 500A and the external device 500C shown in FIG. 2 based on the cooperation rule. When the button on the external device 500A is pressed, a signal indicating the pressing of the button is output from the external device 500A to the user apparatus 100. The cooperation rule control section 122 searches for a cooperation rule by using the external device 500A and the pressing of the button as a key. As a result of the search, the cooperation rule control section 122 determines whether or not there is "THEN" which is the execution clause associated with the pressing of the button on the external device 500A. If there is "THEN", the cooperation rule control section 122 extracts a cooperation target device specified in the "THEN" and its control signal (control information indicating that the cooperation target is the external device 500C and that the left arm should be lifted). The cooperation rule control section 122 outputs a control signal indicating that "the left arm should be lifted" to the external device 500C through the cooperation connection management section 130.

FIG. 11 is a diagram showing an example of cooperation between the external device 500 and the external service system 400 based on the cooperation rule in the user apparatus 100. The example of FIG. 11 shows the control of the external device 500A and the external device 500D shown in FIG. 2 based on the cooperation rule. When the button on the external device 500A is pressed, a signal indicating the pressing of the button is output from the external device 500A to the user apparatus 100. The cooperation rule control section 122 searches for a cooperation rule by using the pressing of the button on the external device 500A as a key. As a result of the search, the cooperation rule control section 122 determines whether or not there is "THEN" which is the execution clause associated with the pressing of the button on the external device 500A. If there is "THEN", the cooperation rule control section 122 extracts a cooperation target device specified in the "THEN" and its control signal (control information indicating that the cooperation target is the external device 500D and that a predetermined voice should be output). The cooperation rule control section 122 outputs a signal for requesting acquisition of the "predetermined voice" to the external service system 400 which is the external device 500D through the cooperation connection management section 130.

Upon reception of the signal for requesting acquisition of the "predetermined voice," the external service system 400 outputs the requested voice data to the user apparatus 100. The voice data may be previously created voice data or voice data created by voice synthesis each time the acquisition request signal is received. The cooperation rule control section 122 outputs the voice data received through the cooperation connection management section 130 to a speaker (output section) 150 and reproduces the voice data.

FIG. 12 is a diagram showing an example of device cooperation based on the cooperation rule in the user apparatus 100. The example of FIG. 12 shows a cooperation rule for the external device 500A and the external device 500E shown in FIG. 2, and shows control based on the cooperation rule in which, on condition that the device input operation information of the two external devices 500A and 500B is provided, the lamp on the external device 500A is turned on. When the button on the external device 500A is pressed, a signal indicating the pressing of the button is output from the external device 500A to the user apparatus 100. When the external device 500B which is an acceleration sensor is shaken, a signal indicating the shaking of the external device 500B is output from the external device 500E to the user apparatus 100.

For example, when the device input operation information Is input from each of the external devices 500A and 500B to the user apparatus 100 within a predetermined time period, the cooperation rule control section 122 searches for a cooperation rule by using the two device input operation information as a key. As a result of the search, the cooperation rule control section 122 determines whether or not there is "THEN" which is the execution clause associated with the pressing of the button on the external device 500A and the shaking of the external device 500B. If there is "THEN", the cooperation rule control section 122 extracts a cooperation target device specified in the "THEN" and its control signal (control information indicating that the cooperation target is the external device 500A and that the lamp should be turned on). The cooperation rule control section 122 outputs a control signal indicating that "the lamp should be turned on" to the external device 500A through the cooperation connection management section 130.

FIG. 13 is a diagram showing an example of cooperation between the external device 500 and an application installed in the user apparatus 100 based on the cooperation rule in the user apparatus 100. FIG. 14 is a flow chart showing processing of cooperation between the external device 500 and the application based on the cooperation rule in the user apparatus 100.

In the example of FIG. 13, the application installed in the user apparatus 100 can be registered in device registration, and application operation definition information can be registered similarly to the device operation definition information. With a mail application used by way of example, the application operation definition information can be configured to include an application input operation definition specifying reception of a mall at the user apparatus 100 from the mail application and an application output operation definition specifying supply of a signal from the user apparatus 100 for operating the mail application (for example, transmission of a template mail or display of a mail viewing window).

For creating a cooperation rule covering the application installed in the user apparatus 100, the rule setting section 322 can perform control to allow selection from the device operation definition information and the application operation information such that the device operation definition information of the external device 500 is included in one of the condition clause information and the execution clause information.

The application control section 123 performs control of a mailer such as control of mail transmission and reception and control of mail viewing. Upon reception of a mail, the application control section 123 notifies the cooperation rule control section 122 of the reception of the mail (S132). The cooperation rule control section 122 searches for a cooperation rule by using the reception of the mail as a key (S133). As a result of the search, the cooperation rule control section 122 determines whether or not there is "THEN" which is the execution clause associated with the reception of the mail. If there is "THEN", the cooperation rule control section 122 extracts a cooperation target device specified in the "THEN" and its control signal (control information indicating that the cooperation target is the external device 500A and that the lamp should be turned on) (S134). The cooperation rule control section 122 outputs a control signal indicating that the lamp should be turned on to the external device 500A through the cooperation connection management section 130 (S135).

Then, similarly to the example of FIG. 9, when the button on the external device 500A is pressed, a signal indicating the pressing of the button is output from the external device 500A to the user apparatus 100. The cooperation rule control section 122 searches for a cooperation rule by using the pressing of the button on the external device 500A in conjunction with the reception of the mail as a key.

As a result of the search, the cooperation rule control section 122 determines whether or not there is "THEN" which is the execution clause associated with the pressing of the button on the external device 500A in conjunction with the reception of the mail. If there is "THEN", the cooperation rule control section 122 extracts a cooperation target application specified in the "THEN" and its control signal (control information indicating that the cooperation target is the mail application and that the mail should be displayed in a viewable state with a predetermined mailer).

The cooperation rule control section 122 instructs the application control section 123 to display the received mail. The application control section 123 performs display control to display the received mail in response to the pressing of the button on the external device 500A. As described above, the application installed in the user apparatus 100 can also be used in cooperation with the external device 500.

FIG. 15 is a diagram showing an example of cooperation between the external device 500, the application installed in the user apparatus 100, and the external service system 400 based on the cooperation rule in the user apparatus 100. FIG. 16 is a diagram showing the processing flow of the cooperation example shown in FIG. 15.

The example of the FIG. 15 shows control based on the cooperation rule in which the cooperation with the external service system 400 is added to the example of FIG. 13. Specifically, in the example of FIG. 13, cooperation with the external device 500A is performed in conjunction with reception of a mail (S141 to S144), and when the button on the external device 500A is pressed (YES at step S145), a signal indicating the pressing of the button is output from the external device 500A to the user apparatus 100. The cooperation rule control section 122 searches for a cooperation rule (3146). As a result of the search, the cooperation rule control section 122 determines whether or not there is "THEN" which is the execution clause associated with the pressing of the button on the external device 500A in conjunction with the reception of the mail. If there is "THEN", the cooperation rule control section 122 extracts a cooperation target application specified in the "THEN" and its control signal (indicating that the cooperation target is the external service system 400 which is the external device 500D and that a request for creating voice synthesis data from the received mail text should be made to the external device 500D) (S147).

The cooperation rule control section 122 receives the received mail data from the application control section 123 and outputs the data to the external service system 400. Upon reception of the request for creating the voice synthesis data, the external service system 400 performs voice synthesis processing based on the mail data (text data) and creates voice synthesis data. the external service system. 400 outputs the voice synthesis data to the user apparatus 100. The cooperation rule control section 122 outputs the voice synthesis data received through the cooperation connection management section 130 to the speaker (output section) 150 and reproduces the voice data (S148).

The device cooperation support system according to the present embodiment supports the device cooperation covering the application installed in the user apparatus 100, in addition to the external device 500.

Specifically, the user apparatus 100 receives input of the operation result output from the external device 500, outputs the control signal for operating the external device 500 to the external device 500, and performs the device cooperation control including the preinstalled application based on the cooperation rule.

The device registration section 321 receives the device operation definition information described above from the device registrant and registers it for each external device 500, and also receives the application operation definition information relating to the application installed in the user apparatus 100 from the registrant and registers it for each application. The rule setting section 322 performs control to allow selection from the device operation definition information and the application operation information. The rule setting section 322 creates the cooperation rule by combining the condition clause information including at least one device input operation definition or application operation definition information and the execution clause information including at least one device output operation definition or the application operation definition information, both definitions and the application operation definition information being selected by the cooperation rule creator. In this case, the rule setting section 322 can create the cooperation rule by performing control to allow selection from the device operation definition information and the application operation information such that the device operation definition information of the external device 500 is included in one of the condition clause information and the execution clause information.

FIG. 17 is a diagram showing a variation of the device cooperation support system according to the present embodiment. The variation shown in FIG. 17 shows an aspect in which the external device 500 is contained in the user apparatus 100.

In such a case, cooperation with an internal device 510A can be performed similarly to the external device 500. For example, when the internal device 510A is an acceleration sensor, control based on a cooperation rule can be performed in cooperation with an external device 500 on condition that the acceleration sensor senses that "the user apparatus 100 is shaken.". Conversely, device cooperation control based on a cooperation rule can be performed such that the internal device 510A operates in response to input information from the external device 500 (for example, when the device 510A is an illumination device, it is lit up).

While the present embodiment has been described, the user apparatus 100 can modify part of the cooperation rule. For example, the cooperation rule control section 122 can perform control such that a rule modification window is displayed to allow a user to make rule modification. In this case, the modified cooperation rule is stored in the storage section 140, but the modification to the cooperation rule made in the user apparatus 100 can be managed by the device cooperation support apparatus 300.

When part of the cooperation rule is modified, the user apparatus 100 transmits the details of modification to the device cooperation support apparatus 300. The device cooperation support apparatus 300 can store, for example, the fact that the modification was performed and the details of modification as additional information to the user apparatus 100 and the cooperation rule. In other words, the device cooperation support apparatus 300 can be configured to manage the details of modification and the presence or absence of modification for each user apparatus 100 without reflecting the details of modification made in the user apparatus 100 on the registered cooperation rule.

The user apparatus 100 can include a built-in temperature sensor or a built-in vibration sensor as in the example of FIG. 17, and also can include a GPS apparatus (position information acquiring apparatus). These sensors and apparatus can be regarded as external devices 500 and operated similarly based on the cooperation rule described above. For example, as in the example of FIG. 17, the built-in temperature sensor or the built-in vibration sensor can be controlled as a target of device registration, and their device operation definition information (device input operation definition/ device output operation definition) can be registered. For example, a cooperation rule can be created which includes condition clause information specifying a threshold value of the built-in temperature sensor and execution clause information indicating that the built-in vibration sensor should be started to vibrate when the temperature condition satisfies the threshold value. The user apparatus 100 can control cooperation with the built-in device based on such a cooperation rule. As another example, the GPS apparatus contained in the user apparatus 100 can be controlled as a target of device registration, and its device operation definition information can be registered. For example, a cooperation rule can be created in which condition clause information indicating that the position information acquired by the GPS apparatus falls within a predetermined range of positions is included, and if the condition is satisfied, predetermined voice should be output in cooperation with the speech application of the external service system. 400 (external device 500) as shown in FIG. 11.

The device cooperation support system according to the present embodiment can use the GPS apparatus contained in the user apparatus 100 to control the monitoring of the user apparatus 100 in cooperation with the external device 500. As described in FIG. 6, the setup information of the user apparatus 100 is collected as appropriate, and the device cooperation support system can also know the position information of the user apparatus 100 in cooperation with the external device 500. For example, a cooperation rule can be created which includes condition clause information indicating that the button on the external device 500A is pressed and execution clause information indicating that the position information acquired by the GPS apparatus contained in the user apparatus 100 should be transmitted to the device cooperation support apparatus 300. For example, such a monitoring rule can be added with no exception to the execution clause information of all the cooperation rules created in the present embodiment, added to a predetermined cooperation rule, or created as a monitoring rule isolated from the other cooperation rules. A single monitoring rule may be set for all the external devices 500 available for cooperation with the user apparatus 100. In this manner, the monitoring rule can be controlled independently of or in conjunction with the cooperation rule used for control of cooperation with the external device as described above. The device cooperation support apparatus 300 can store the position information transmitted from the user apparatus 100 in the storage apparatus 300 similarly to the setup information, and control the monitoring of the position of the user apparatus 100 or the like in cooperation with a monitoring section or a separately provided monitoring system.

The cooperation rule control section 122 of the user apparatus 100 can store a cooperation rule execution history (a rule execution log including at least an executed rule and the time of execution) in the storage section 140. Similarly to the collection of the setup information performed in the device cooperation support apparatus 300, the rule execution log in the user apparatus 100 can be managed by the device cooperation support apparatus 300. The cooperation rule control section 122 of the user apparatus 100 can transmit the rule execution log to the device cooperation support apparatus 300 at an arbitrary time, and also, can receive a log acquisition request delivered from the device cooperation support apparatus 300, and in response thereto, transmit the rule execution log to the device cooperation support apparatus 300. The device cooperation support apparatus 300 can store the rule execution log received from each user apparatus 100 in the storage apparatus 330 and use the received log for user behavior analysis or user preference analysis. The analysis may be performed in cooperation with an analysis section, not shown, or a separately provided analysis system. The cooperation rule execution history can include, for example, information detected by a temperature sensor or a humidity sensor.

In addition, the mechanism for collecting such a rule execution log from each user apparatus 100 can be used to implement a billing function. Specifically, in addition to the registration of the external device 500, the cooperation rule creation, and the rule delivery as described above, the user apparatus 100 can manage the cooperation rule execution log, and the device cooperation support system can keep track of all the cooperation between the user apparatus 100 and the external device 500. Thus, based on the rule execution log, the device cooperation support system can cooperate with a billing section, not shown, or a separately provided billing system to collect charges for cooperation services with the external devices 500 from users owning the user apparatuses 100. It is also possible to bill the device registrant or the cooperation rule creator or to apply a well-known billing model in which the charges collected from users are distributed to the device registrant or the cooperation rule creator.

As an example of the control of monitoring, a monitoring system can be constituted by combining position information obtained from the GPS apparatus of the user apparatus 100 described above with the cooperation rule execution history. For example, as shown in FIG. 18, the device cooperation support apparatus 300 uses the position information of the user apparatus 100 to display an icon associated with each user apparatus 100 on a predetermined map. In this case, the display form of the icon can be changed depending on the cooperation rule execution history such that the icon display is controlled for each user apparatus 100 in accordance with the execution history. For example, when the external device 500 is sensor equipment such as a temperature sensor or a humidity sensor (or when the external device 500 includes sensor equipment), the sensor detection information can be collected as the execution history front the user apparatus 100. The device cooperation support apparatus 300 can create a monitoring window in which the icon of each user apparatus 100 is placed on a map based on the position information, and can control the display of each icon in different colors according to the threshold value of temperature or humidity based on the sensor detection information. In addition, the operation history of the external device 500 can be acquired from the execution history. When a button on the external device 500 for indicating abnormality is pressed, the associated icon (showing the user apparatus 100) in the monitoring window can be immediately changed in color or shape or an alarm window or the like can be displayed separately in the monitoring window.

For example, the user apparatus 100 may be a gateway apparatus or a router apparatus which requires few user operations (for example, merely requires turn-on/turn-off operations), other than the apparatus operated by a user.

Each of the functions of the apparatuses constituting the device cooperation support system described above can be implemented by a program. A computer program previously provided for implementing each function can be stored on an auxiliary storage apparatus, a control unit such as a CPU can read the program stored on the auxiliary storage apparatus to a main storage apparatus, and the program read to the main storage apparatus can be executed by the control unit to perform the function of each component.

The program may be recorded on a computer readable recording medium and provided for a computer. Examples of the computer readable recording medium include optical disks such as a CD-ROM, phase-change optical disks such as a DVD-ROM, magneto-optical disks such as a Magnet-Optical (MO) disk and Mini Disk (MD), magnetic disks such as a floppy Disk® and removable hard disk, and memory cards such as a compact Flash®, smart media, SD memory card, and memory stick. Hardware apparatuses such as an integrated circuit (such as an IC chip) designed and configured specifically for the purpose of the present invention are included in the recording medium.

Although the embodiment of the present invention has been described, that embodiment is illustrative and is not intended to limit the scope of the present invention. The novel embodiment can be implemented in various other forms, and various omissions, substitutions, and modifications can be made thereto without departing from the spirit or scope of the present invention. The embodiment and its variations are encompassed within the spirit or scope of the present invention and within the invention set forth in the claims and the equivalents thereof.

DESCRIPTION OF THE REFERENCE NUMERALS

100 USER APPARATUS
110 COMMUNICATION SECTION
120 CONTROL SECTION
121 COOPERATION MANAGEMENT SECTION
122 COOPERATION RULE CONTROL SECTION
123 APPLICATION CONTROL SECTION
130 COOPERATION CONNECTION MANAGEMENT SECTION
140 STORAGE SECTION
150 INPUT/OUTPUT SECTION
300 DEVICE COOPERATION SUPPORT APPARATUS
310 COMMUNICATION APPARATUS
320 CONTROL APPARATUS
321 DEVICE REGISTRATION SECTION
322 RULE SETTING SECTION
323 RULE DELIVERY SECTION
330 STORAGE APPARATUS
400 EXTERNAL SERVICE SYSTEM
500 EXTERNAL DEVICE

The invention claimed is:

1. A device cooperation support system comprising:
   at least one user apparatus configured to receive an operation result output from an external device, to output a control signal for operating the external device to the external device, and to perform device cooperation control based on a device cooperation rule; and
   a device cooperation support apparatus configured to support device cooperation between the user apparatus and the external device,
   wherein the device cooperation support apparatus includes:
   a device registration section configured to receive device operation definition information from a device registrant and to register the device operation definition information for each external device, the device operation definition information including at least one device input operation definition specifying operation result information provided from the external device to the user apparatus as an operation of the external device and/or at least one device output operation definition specifying an operation of the external device provided from the user apparatus to the external device;
   a rule setting section configured to perform control to allow selection from the device operation definition information and to create the device cooperation rule by combining condition clause information including at least one of the device input operation definitions with execution clause information including at least one of the device output operation definitions, both definitions being selected by a cooperation rule creator; and
   a rule delivery section configured to perform control to allow selection of at least one of the user apparatuses as a delivery destination of the device cooperation rule and to deliver the device cooperation rule to the selected user apparatus based on association between the selected user apparatus and the device cooperation rule.

2. The device cooperation support system according to claim 1, wherein the rule setting section is configured to perform control such that a first external device for use in the condition clause information can be selected from a plurality of registered external devices and the device input operation definition of the first external device can be selected, and such that a second external device for use in the execution clause information can be selected from the plurality of registered external devices and the device output operation definition of the second external device can be selected, and
   the rule setting section is configured to perform control such that the same external device or different external devices can be selected as the first external device and the second external device.

3. The device cooperation support system according to claim 1, wherein a storage section of the device cooperation support apparatus stores group information representing the user apparatuses divided into groups according to a preset classification, and
   the rule setting section is configured to perform control to allow selection of at least one of the groups as the user apparatus corresponding to a delivery destination of the device cooperation rule and to perform control such that the device cooperation rule can be set collectively for the user apparatuses included in the selected group.

4. The device cooperation support system according to claim 1, wherein the external device includes sensor equipment, illumination equipment, input equipment, or an external service system configured to perform predetermined processing based on a request from the user apparatus and to provide a processing result to the user apparatus.

5. The device cooperation support system according to claim 1, wherein the external device includes a device capable of communicating with the user apparatus via a wireless communication or a wired communication and a device previously contained in the user apparatus.

6. The device cooperation support system according to claim 1, wherein the device cooperation rule includes the execution clause information specifying that position information obtained by a GPS apparatus contained in the user apparatus should be transmitted to the device cooperation support apparatus, and
   the device cooperation support apparatus further includes a monitoring section configured to receive the position information transmitted from the user apparatus in conjunction with the device cooperation control based on the device cooperation rule.

7. A non-transitory computer readable medium including a program executed in a device cooperation support apparatus for connection to a user apparatus configured to receive an operation result output from an external device, to output a control signal for operating the external device to the external device, and to perform device cooperation control based on a device cooperation rule, the program comprising:
   a function of receiving device operation definition information from a device registrant and registering the device operation definition information for each external device, the device operation definition information including at least one device input operation definition specifying operation result information provided from the external device to the user apparatus as an operation of the external device and/or at least one device output operation definition specifying an operation of the external device provided from the user apparatus to the external device;
a function of performing control to allow selection from the device operation definition information and creating the device cooperation rule by combining condition clause information including at least one of the device input operation definitions with execution clause information including at least one of the device output operation definitions, both definitions being selected by a cooperation rule creator; and
a function of performing control to allow selection of at least one of the user apparatuses as a delivery destination of the device cooperation rule and delivering the device cooperation rule to the selected user apparatus based on association between the selected user apparatus and the device cooperation rule.

8. A device cooperation support system comprising:
a user apparatus configured to receive an operation result output from an external device, to output a control signal for operating the external device to the external device, and to perform device cooperation control based on a cooperation rule; and
a device cooperation support apparatus configured to support device cooperation between the user apparatus and the external device,
wherein the device cooperation support apparatus includes:
a device registration section configured to receive device operation definition information from a registrant and to register the device operation definition information for each external device, the device operation definition information including at least one device input operation definition specifying operation result information provided from the external device to the user apparatus as an operation of the external device and/or at least one device output operation definition specifying an operation of the external device provided from the user apparatus to the external device, and to receive application operation definition information relating to an application in the user apparatus from a registrant and to register the application operation definition information for each application;
a rule setting section configured to perform control to allow selection from the device operation definition information and the application operation definition information and to create the device cooperation rule by combining condition clause information including at least one of the device input operation definitions or the application operation definition information with execution clause information including at least one of the device output operation definitions or the application operation definition information, both definitions and the application operation definition information being selected by a cooperation rule creator; and
a rule delivery section configured to perform control to allow selection of at least one of the user apparatuses as a delivery destination of the cooperation rule and to deliver the cooperation rule to the selected user apparatus based on association between the selected user apparatus and the cooperation rule,
wherein the rule setting section is configured to create the cooperation rule by performing control to allow selection from the device operation definition information and the application operation definition information such that the device operation definition information of the external device is included in either the condition clause information or the execution clause information.

* * * * *